United States Patent
Iwashita

[11] Patent Number: 6,122,998
[45] Date of Patent: *Sep. 26, 2000

[54] FORCE CONTROL METHOD FOR A BAR FEEDER OF A LATHE

[75] Inventor: Yasusuke Iwashita, Oshino-mura, Japan

[73] Assignee: Fanuc, Ltd., Yamanashi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/736,243

[22] Filed: Oct. 24, 1996

Related U.S. Application Data

[63] Continuation of application No. 08/387,773, Feb. 21, 1995, abandoned.

[30] Foreign Application Priority Data

Jun. 29, 1993 [JP] Japan ..................................... 5-184468

[51] Int. Cl.⁷ ...................................................... B23B 1/00
[52] U.S. Cl. ............................... 82/1.11; 82/126; 82/118; 82/127; 82/148; 414/14
[58] Field of Search ........................... 82/118, 127, 1.11, 82/126, 148, 162; 414/14, 17, 18; 364/161, 162, 183, 474.01, 474.17; 318/560, 566, 568.22

[56] References Cited

U.S. PATENT DOCUMENTS

| | | | |
|---|---|---|---|
| 5,047,702 | 9/1991 | Hanaki et al. | 318/625 |
| 5,105,135 | 4/1992 | Nahiki et al. | 318/568.1 |
| 5,181,441 | 1/1993 | Okada | 82/118 |
| 5,228,371 | 7/1993 | Berns | 82/127 |
| 5,304,906 | 4/1994 | Arita et al. | |
| 5,440,213 | 8/1995 | Arita et al. | |

FOREIGN PATENT DOCUMENTS

| | | | |
|---|---|---|---|
| 61-65754 | 4/1986 | Japan . | |
| 2-10411 | 1/1990 | Japan . | |
| 121748 | 5/1991 | Japan | 82/118 |
| 3-161203 | 7/1991 | Japan . | |
| 5-116094 | 5/1993 | Japan . | |
| 405309503 | 11/1993 | Japan | 82/127 |
| 406055306 | 3/1994 | Japan | 82/127 |
| 0658530 | 5/1979 | U.S.S.R. | 82/118 |

*Primary Examiner*—Henry W. H. Tsai
*Attorney, Agent, or Firm*—Staas & Halsey, LLP

[57] ABSTRACT

A force control method for a bar feeder supporting a workpiece in a lathe, including seizing the workpiece by a Z-axis spindle of the lathe and the bar feeder, performing position control by the Z-axis spindle of the lathe, and performing force control by the bar feeder to apply a constant torque to the workpiece during the force control of the bar feeder supporting the workpiece in the lathe. This control of the bar feeder does not require the Z-axis spindle of the lathe and the bar feeder to be synchronized for the position control in the Z-axis direction, and prevents the workpiece from being deflected.

6 Claims, 3 Drawing Sheets

FORCE CONTROL METHOD FOR A BAR FEEDER OF A LATHE

This application is a continuation, of application No. 08/387,773, filed Feb. 21, 1995, now abandoned.

BACKGROUND OF THE INVENTION

1. Field of the Invention

The present invention relates to a control method for a bar feeder for supporting a workpiece in a lathe, and more particularly, to a control method for controlling a bar feeder by force control.

2. Description of the Related Art

Generally, in working an elongated workpiece by means of a lathe, a bar feeder is used to guide the workpiece in the Z-axis direction. One side of the workpiece is supported by means of a bar feeder, while the other side of the workpiece is attached to a Z-axis of the lathe, whereby position control in the Z-axis direction is effected.

Conventionally, this position control of the bar feeder is carried out by means of a controller. During the lathing operation, the position control in the Z-axis direction of the lathe and the position control of the bar feeder must be synchronized with each other. For example, the following method is known as a control method to attain this.

(1) The position control of the Z-axis of the lathe and the position control of the bar feeder in the Z-axis direction are synchronized with each other by controlling the lathe and the bar feeder by means of the same controller.

(2) In the case where the lathe and the bar feeder cannot be controlled by means of the same controller, the bar feeder simply supports the workpiece in a free state without seizing it, and the operation is carried out by the position control of the Z-axis of the lathe only.

However, the aforementioned control method for the bar feeder of the conventional lathe involves the following problems.

(1) When effecting the Z-direction position control of the conventional lathe and bar feeder by means of the same controller, it is necessary to use a controller which serves to control both the lathe and the bar feeder. The controller of this type must be an expensive complicated device. Moreover, the controller of this type must be set corresponding to individual lathes and bar feeders, so that it lacks in general-purpose properties.

(2) When controlling the lathe and the bar feeder individually by means of independent controllers, on the other hand, the two controllers must be synchronized. It is difficult, however, to synchronize the independent controllers.

(3) In the case where the conventional bar feeder is operated in a free state by the control of the Z-axis of the lathe only, a slender workpiece is arched and deflected between the lathe and the bar feeder, so that it cannot be worked with accuracy and stability.

SUMMARY OF THE INVENTION

An object of the present invention is to control a bar feeder of a lathe without requiring synchronization for Z-direction position control of a Z-axis and the bar feeder of the lathe and so that a workpiece can be prevented from being deflected.

In a method according to the present invention, a workpiece is seized by means of a Z-axis of the lathe and the bar feeder, the Z-axis of the lathe performs position control, and the bar feeder performs force control, whereby a fixed force is applied to the workpiece, in the control of the bar feeder of the lathe. This fixed force applied by the bar feeder to the workpiece is adjusted to a value low enough not to hinder the position control of the Z-axis of the lathe.

The workpiece is seized by means of the Z-axis of the lathe and the bar feeder, the Z-axis of the lathe performs the position control, and the bar feeder performs the force control, whereby the bar feeder is controlled so as to apply the fixed force to the workpiece. A tension is applied to the workpiece by the force applied to the workpiece, thereby preventing the workpiece from sagging between the Z-axis of the lathe and the bar feeder. By adjusting the fixed force applied by the bar feeder to the workpiece to the value low enough not to hinder the position control of the Z-axis of the lathe, moreover, the force control of the bar feeder is prevented from influencing the position control for the lathe.

Further, the force control of the bar feeder according to the present invention is effected in a manner such that an external load acting on the workpiece is estimated by means of a disturbance estimating observer, an estimated disturbance load torque obtained by the estimation is fed back, and feedback control is executed so that the estimated disturbance load-torque agrees with a force command value. Also, a deviation value for a force from the disturbance estimating observer is a value obtained by a summation operation including subtracting the product of the speed of a motor for the bar feeder and a set coefficient from the estimated disturbance load torque (equivalently, adding to the estimated disturbance load torque the product of the speed and the negative of the set coedfficient).

Furthermore, the disturbance estimating observer used for the bar feeder according to the present invention estimates the estimated disturbance load torque from the force command value given to the motor for the bar feeder and the actual speed of the motor.

DETAILED DESCRIPTION OF THE PREFERRED EMBODIMENTS

Arrangement of the Embodiment
(Arrangement of lathe and bar feeder for carrying out the present invention)

Figure 1:
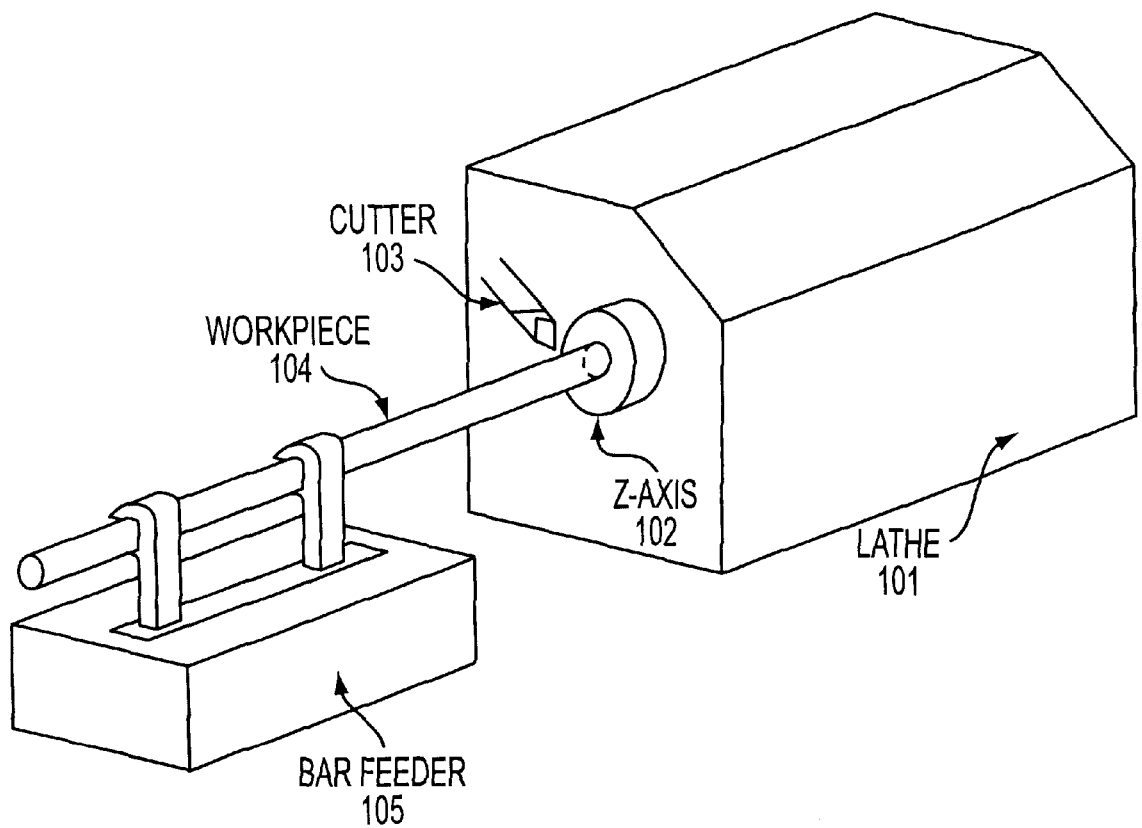
FIG. 1 is a view showing an example of an arrangement of a lathe and a bar feeder according to the present invention.

FIG. 1 explains first an example of an arrangement of a lathe and a bar feeder according to the present invention. In FIG. 1, one side of a workpiece 104 is attached to a Z-axis 102 of a lathe 101, while the other side of the workpiece 104 is attached to a bar feeder 105.

The workpiece 104 attached to the Z-axis 102 of the lathe 101 is worked by means of a cutter 103 in the X-axis direction in the same manner as in a conventional lathe.

Moreover, the bar feeder 105 includes a controller (not shown) which is independent of a controller of the lathe 101. The controller of the bar feeder 105 applies a fixed force to the workpiece 104 by force control without effecting position control for the workpiece. The direction of the force is a direction in which the workpiece 104 leaves the lathe 101, and the magnitude of this force is set at a fixed value smaller than that of a force which is applied to the workpiece 104 in the control of the Z-axis of the lathe 101. By this force given from the bar feeder 105, the workpiece 104 is continually subjected to a tension which is low enough not to influence the control of the Z-axis of the lathe 101.

The force control of the bar feeder 105 is effected by, for example, controlling a servomotor, which is used to drive a drive shaft of the bar feeder, by means of a control system for the bar feeder.

The system configurations of the lathe 101 and the bar feeder 105 shown in FIG. 1 is not limited to the illustrated configurations according to one embodiment. The lathe 101 includes an apparatus which has the function of a conventional lathe, and likewise, the bar feeder 105 includes an apparatus which has the function of a conventional bar feeder.

The following is a description of an arrangement of the control system for this bar feeder and an arrangement for the force control by means of the bar feeder control system.
(Arrangement of Bar Feeder Control System)

Figure 2:
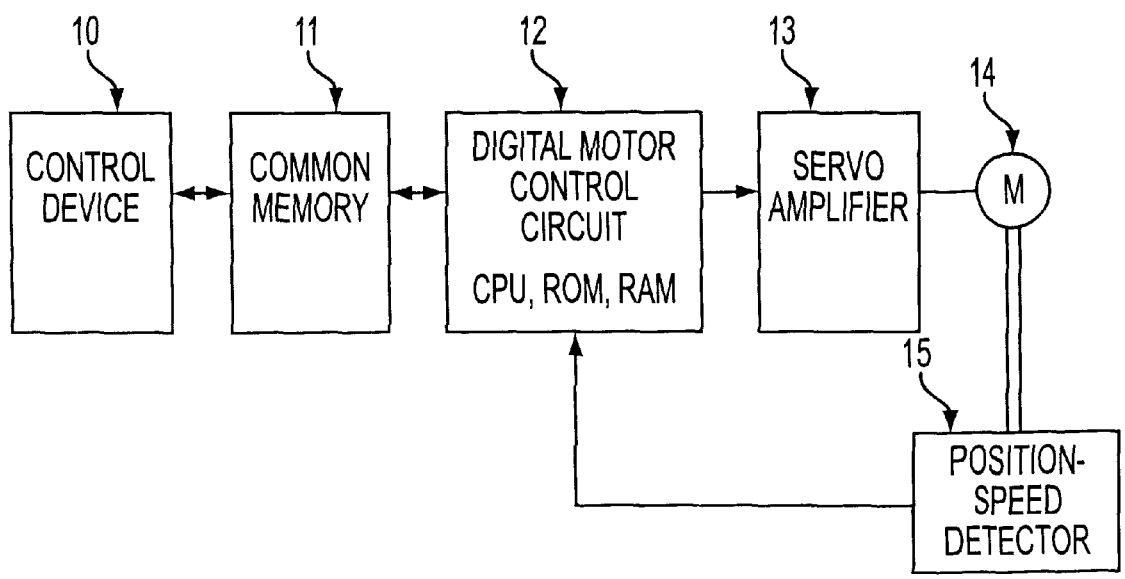
FIG. 2 is a block diagram showing the principal part of a control system for the bar feeder for carrying out a method according to the present invention.

Referring to the block diagram of FIG. 2 showing the principal part of the bar feeder control system for carrying out a method according to the present invention, the arrangement of the bar feeder control system will be described. The bar feeder control system shown in FIG. 2 is an example which uses servomotors.

In the drawing, numeral 10 denotes a control device similar to a control device for controlling a machine, such as a general machine tool or robot. Movement commands, force commands, and various control signals are delivered from the control device 10 to a digital motor control circuit 12 through a common memory 11. The digital motor control circuit 12, which is composed of a processor (CPU), ROM, RAM, etc., digitally executes motor control for the position, speed, force, etc., and controls a servomotor 14 for each axis through the medium of a servo amplifier 13 which is composed of a transistor inverter and the like. Numeral 15 denotes a position-speed detector for detecting the position and speed, which is composed of a pulse coder or the like mounted on the motor shaft of the servomotor, and delivers detected position and speed feedback signals to the digital motor control circuit 12. Although those arrangements may be identical with arrangements for a conventional digital servo circuit, they are different from the arrangements for the conventional digital servo circuit in that force control is effected.
(Arrangement for Bar Feeder Force Control)

Figure 3:
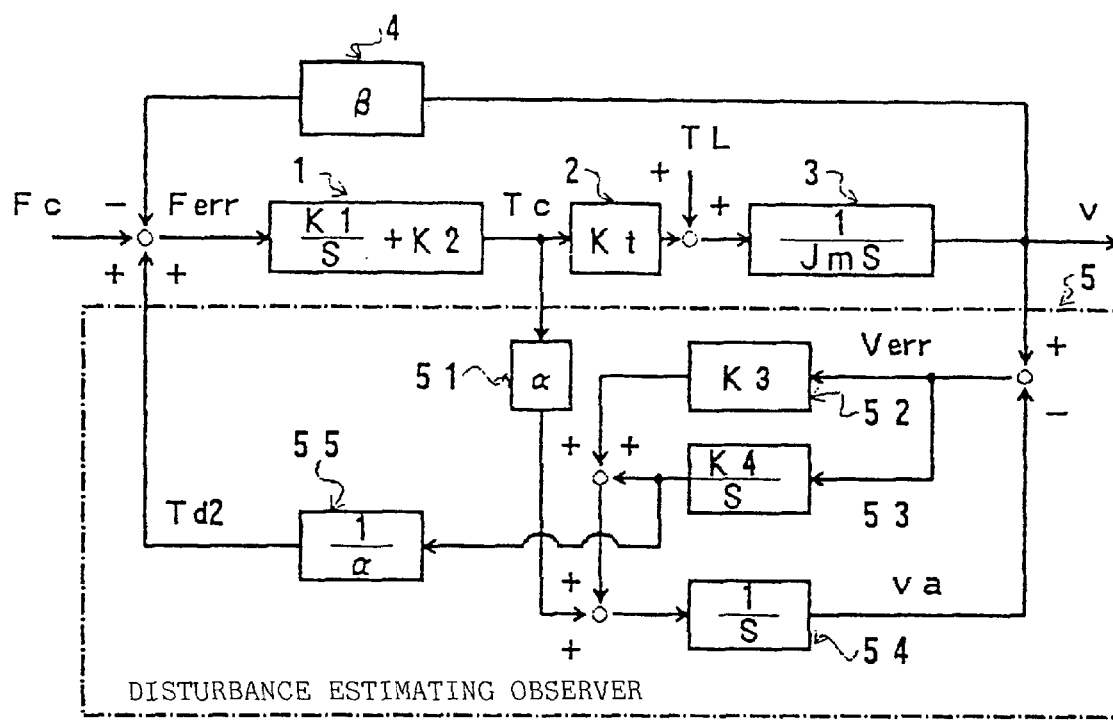
FIG. 3 is a block diagram of a force control system according to an embodiment of the present invention.

Referring now to the block diagram of FIG. 3 showing a force control system according to an embodiment of the present invention, the arrangement for force control for the case in which the bar feeder is subjected to the force control in the bar feeder control system will be described.

Referring to FIG. 3, the servomotor for driving the bar feeder will be described as an example. In this embodiment, the force control is based on proportional-plus-integral (PI) control, and an external force acting on the servomotor is detected by means of a disturbance estimating observer. K1 of a term 1 is an integral constant used in force feedback control, and K2 is a proportional constant. Terms 2 and 3 are transfer functions of the motor, Kt is a torque constant, Jm is inertia, and a term 4 is a term in which a value obtained by multiplying an actual speed v of the motor by a set coefficient β is subjected to feedback.

In the drawing, 5 (indicated by a dashed line) designates the disturbance estimating observer for detecting a disturbance load torque externally applied to the motor. It estimates an estimated disturbance load torque Td2 from a torque command Tc given to the motor and the actual speed v of the motor. More specifically, the disturbance estimating observer 5 outputs the disturbance load torque Td2 which is an estimated value obtained in accordance with the torque command Tc and the actual speed v of the motor without making a direct measurement. TL represents a disturbance load torque the motor receives actually, and S represents a Laplace operator.

The estimated disturbance load torque Td2 estimated by means of the disturbance estimating observer 5 is subtracted from a force command Fc (although the estimated disturbance load torque Td2 obtained by means of the disturbance estimating observer 5 is illustrated as if it were added to the force command in FIG. 3, it is subtracted actually, since the estimated disturbance load torque Td2 is obtained with opposite polarity), the value obtained by multiplying the actual speed v of the motor by the set coefficient β is further subtracted to obtain a force deviation Ferr (=Fc+Td2−β·v) in the term 4, proportional-plus-integral processing is executed to obtain the torque command (current command) Tc in accordance with this force deviation Ferr, and delivers the torque command to the motor. A force (force generated by the servomotor) applied from the servomotor to an object of control is controlled so as to agree with the force command Fc by feedback control which covers the term 4.

Moreover, K3 and K4 of terms 52 and 53 of the disturbance estimating observer 5 are parameters of the disturbance estimating observer, and α of a term 51 is a parameter value by which the current value Tc as the torque command to be actually delivered to the servomotor is multiplied, and is given by (α=Kt*/Jm*) which is obtained by dividing an estimated value Kt* of the torque constant of the motor by an estimated value of the inertia Jm*. Furthermore, a term 55 is a term in which the estimated disturbance load torque Td2 is obtained by multiplying an output from the term 53 by (1/α).

Function of the Embodiment

The following is a description of the function of the embodiment of the present invention.
(Operation for Bar Feeder Force Control)

The following is a description of force control such that the force applied from the bar feeder to the workpiece is constant without regard to the position of the workpiece.

Let us suppose that a α=Kt*/Jm* is given, the torque constant Kt of the motor is equal to its estimated value Kt* (Kt=Kt*), and the inertia Jm of the motor is equal to its estimated value Jm* (Jm =Jm*), in the aforesaid arrangement for the bar feeder force control shown in FIG. 3.

Thereupon, $$(=Tc \cdot Kt+TL)(1/Jm \cdot S)=v \tag{1}$$

is obtained according to the computation of the term 3, and an output va of the term 5 is obtained as $$\{Tc \cdot (Kt/Jm)+(v-va)K3+(v-va)(K4/S)\} \cdot (1/S)=va. \tag{2}$$

Transforming equation (1), we obtain $$Tc=(v \cdot Jm \cdot S-TL)/Kt. \tag{3}$$

Substituting this equation (3) for equation (2) and rearranging, we obtain $$(v \cdot Jm \cdot S - TL)/Jm + (v - va)K3 + (v - va)(K4/S) = va \cdot S, \quad (4)$$

$$S(v - va) + (v - va) \cdot K3 + (v - va)(K4/S) = TL/Jm. \quad (5)$$

From equation (5), moreover, Verr (=v−va) is obtained as follows:

$$\text{Verr} = v - va = (TL/Jm)[1/\{S + K3 + (K4/S)\}]. \quad (6)$$

From this equation (6), an output Td1 of the term 53 is given by equation (7) as follows:

$$Td1 = \text{Verr} \cdot (K4/S) = (TL/Jm)\{K4/(S^2 + K3 \cdot S + K4)\}. \quad (7)$$

If the parameters K3 and K4 are selected so as to stabilize the poles in equation (7), Td1=TL/Jm can be approximated, and this relational expression indicates that a total disturbance torque Td1 can be estimated.

Then, the estimated disturbance load torque Td2 is obtained by multiplying the total disturbance torque Td1 by 1/α (=Jm*/Kt*), and the force feedback control is carried out by using this estimated disturbance load torque Td2.

In this force feedback control using the estimated disturbance load torque Td2, the force deviation is obtained from the force command Fc and the difference between the estimated disturbance load torque Td2 estimated by means of the disturbance estimating observer 5 and the value obtained by multiplying the actual speed v of the motor by the set coefficient β in the term 4, whereby the force deviation Ferr (=Fc+Td2−β·v) is obtained, and moreover, the torque command Tc is obtained by subjecting this force deviation Ferr to the proportional-plus-integral processing. This torque command Tc is a current command, and the motor torque control can be effected by delivering this current command to the motor.

More specifically, the force (force generated by the servomotor) applied from the servomotor to the object of control is controlled so as to agree with the force command Fc by the feedback control which covers the term 4. If this force command Fc is given at a certain set value, for example, then a set force will always be generated from the motor without regard to the size of the load actually acting on the servomotor.

If a fixed value smaller than the Z-axis force of the lathe is previously set as the force command Fc in the case where the bar feeder is controlled by this force control, therefore, the bar feeder can always output a constant force without regard to the position of the workpiece, and apply a tension to the workpiece without being synchronized with the lathe.

(Operation of Bar Feeder Control System)

Figure 4:
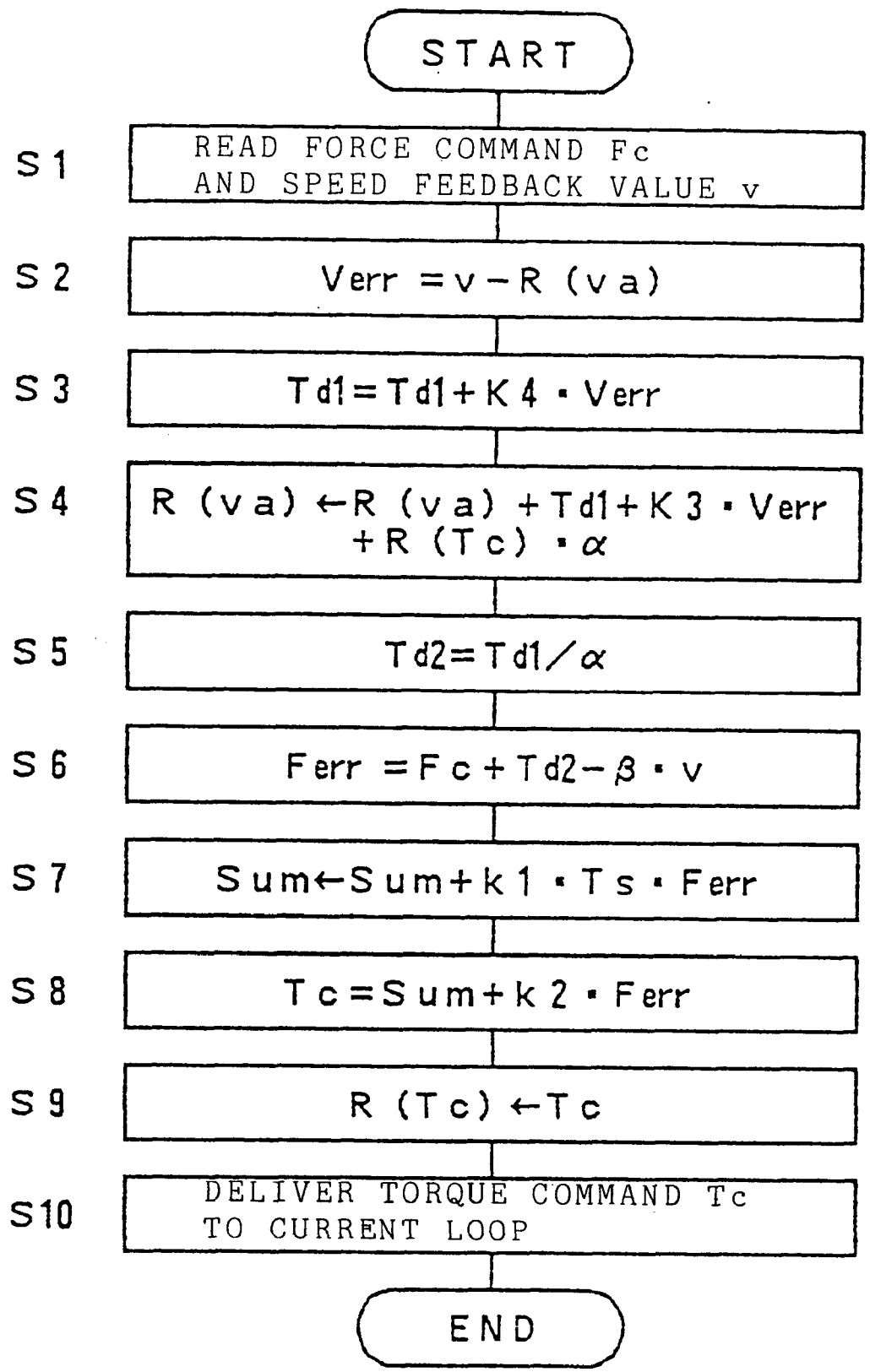
FIG. 4 is a flowchart showing force control processing according to the embodiment of the present invention.

Referring now to FIG. 2 and the flowchart of FIG. 4 showing force control processing the processor of the digital motor control circuit executes, the operation of the control system for carrying out the aforesaid force control will be described.

Here let it be supposed that the constants K3 and K4 and the coefficients α and β are set beforehand in the digital motor control circuit 12.

Moreover, the servomotor 14 can effect position-speed control by executing conventional position-speed loop processing, and this position-speed control and the force control processing may be arranged so as to be selectable by switching.

In the force control, the processor of the digital motor control circuit 12 executes the processing shown in FIG. 4 with every predetermined main period (the same period as a speed loop processing period, normally).

"Step S" will be used in the description to follow.

Step S1: First, the force command value Fc delivered from the control device 10 through the common memory 11 is read, and the speed feedback value v, detected by means of the position-speed detector 15 and fed back, is read. This force command value Fc is set at a value such that a fixed force smaller than the force applied to the workpiece, in order to effect the position control of the Z-axis of the lathe, for example, is generated.

Step S2: Then, processing of the disturbance estimating observer 5 is started, whereupon the difference Verr between the actual speed and the estimated speed is obtained by subtracting the estimated speed va stored in a register R from the speed feedback value v read in Step S1. In FIG. 4, the estimated speed stored in the register R is represented by R(va).

Step S3: Further, a value obtained by multiplying the aforesaid error Verr by the set constant K4 is added to the value in an accumulator stored in the total estimated disturbance value Td1, whereby the total estimated disturbance value Td1 is obtained. This processing is identical with the processing in the term 53 of FIG. 3.

Step S4: Then, the total estimated disturbance value Td1 obtained in Step S3 is added to the value in a register R(va) stored with the estimated speed va, and also, a value obtained by multiplying the difference Verr obtained in Step S2 by the constant K3 is added. Further, the estimated speed value va for the preceding period stored in a register R(Tc) is obtained, and is loaded into the register R(va). Thus, this step is a process in which the estimated speed va is obtained by the processing in the terms 51, 54, etc.

Step S5: Then, the estimated disturbance load torque Td2 is obtained by dividing the total estimated disturbance value Td1, obtained in the process of Step S3, by the set coefficient α.

The above processing of Steps S2 to S5 is the processing of the disturbance estimating observer 4 which is used to obtain the estimated disturbance load torque.

Step S6: The estimated disturbance load torque Td2 thus obtained is utilized as a force feedback value, and is subtracted from the force command value Fc. Since the estimated disturbance load torque Td2 obtained by means of the disturbance estimating observer is opposite to the force command value Fc in polarity, the difference is obtained substantially by adding the estimated disturbance load torque Td2 to the force command Fc, in practice. Moreover, the force deviation Ferr is obtained by subtracting the product of the speed feedback value v obtained in Step S1 and the set coefficient β. In other words, the force deviation Ferr is obtained by making computation according to the following equation:

$$\text{Ferr} = Fc + Td2 - \beta \cdot v.$$

Step S7: Then, integral processing is executed by adding a value obtained by multiplying the force deviation Ferr by the integral constant K1 and a period Ts for the processing shown in FIG. 4 to the value in an accumulator Sum which functions as an integrator (integral processing of the term 1 in FIG. 3).

Step S8: The torque command Tc is obtained by adding the product of the force deviation Ferr and the proportional constant K2 to the value in the accumulator Sum. In other words, the processing of the term 1 in FIG. 3 is executed.

Steps S9 and S10: The torque command Tc thus obtained is loaded into the register R(Tc) to be used in the next period, and is delivered to a current loop, whereupon the processing for the period concerned is finished.

The bar feeder performs the force control through the operation of the control system in the processes of the aforementioned steps, thereby applying a fixed force to the workpiece. Even in the case where the Z-axis of the lathe and the bar feeder do not operate in synchronism with each other, the control can be effected, without causing sagging or the like of the workpiece, by applying the fixed force to the workpiece without regard to the position control of the Z-axis of the lathe.

In the case described above, the value obtained by adding the product of the actual speed v of the motor and the coefficient β to the estimated disturbance load torque Td2 is used as the feedback value. However, it is for the purpose of preventing vibration of the control system to improve its stability and preventing runaway of the motor that a function of the actual speed v of the motor is utilized as part of the feedback value. Thus, in the case where the motor is not subjected to any reaction force from the object of control, the estimated disturbance load torque Td2 estimated by means of the disturbance estimating observer is very small. In consequence, the force deviation Ferr becomes great and never decreases, so that the motor runs away.

In consideration of the allowance of the characteristics of a drive system for the lathe, therefore, it is not always necessary to feed back a value proportional to the speed in the case where a reaction force is obtained from the Z-axis.

Modification

In the embodiment described above, the force control for the workpiece is carried out by means of the bar feeder. However, the workpiece control based on this force control may be also applied to a tail stock of the lathe.

According to the present invention, as described above, the force control of the bar feeder of the lathe does not require the z-axis and the bar feeder of the lathe to be synchronized for the position control in the Z-axis direction, and the workpiece can be prevented from being deflected.

What is claimed is:

1. A force control method for a workpiece in a lathe, comprising the steps of:
   supporting a workpiece by a Z-axis spindle of a lathe and by a bar feeder;
   controlling a position of the workpiece by the Z-axis spindle of the lathe;
   applying a constant force to the workpiece by performing force control through the bar feeder, the force control comprising
      estimating a disturbance load torque by a disturbance estimating observer, and
      generating a deviation value by performing a summation operation including subtracting a product of a speed of a motor for the bar feeder and a set coefficient from the estimated disturbance load torque,
      whereby the disturbance load torque agrees with a force command value.

2. A force control method for a workpiece in a lathe, comprising the steps of:
   supporting a workpiece by a Z-axis spindle of a lathe and by a bar feeder;
   controlling a position of the workpiece by the Z-axis spindle of the lathe;
   applying a constant force to the workpiece by performing force control through the bar feeder, the force control comprising
      estimating a disturbance load torque from a torque command value supplied to a motor for the bar feeder and an actual speed of the motor by a disturbance estimating observer and
      executing feedback control so that said disturbance load torque agrees with a force command value.

3. A force control method for a workpiece in a lathe, comprising the steps of:
   supporting a workpiece by a Z-axis spindle of a lathe and by a bar feeder;
   controlling a position of the workpiece by the Z-axis spindle of the lathe; and
   performing force control of a force applied to the workpiece through at least one of the bar feeder and a tail stock of the lathe to maintain a constant external load on the workpiece, the force control comprising
      estimating a disturbance load torque by a disturbance estimating observer based upon a torque command value supplied to a servomotor and an actual speed of the servomotor, and
      executing feedback control of the force based upon the estimated disturbance load torque.

4. A force control device, comprising:
   means for supporting a workpiece by a Z-axis spindle of a lathe;
   means for controlling a position of the workpiece supported by a bar feeder and by the Z-axis spindle of said lathe;
   means for applying a constant force to said workpiece, said constant force applying means comprising
      a servomotor;
      means for estimating a disturbance load torque; and
      means for executing feedback control based on a deviation value whereby the disturbance load torque agrees with a force command value, the deviation value obtained by performing a summation operation including subtracting a product of a speed of the servomotor and a set coefficient from said disturbance load torque.

5. A force control device, comprising:
   means for supporting a workpiece by a Z-axis spindle of a lathe;
   means for controlling a position of the workpiece supported by a bar feeder and by the Z-axis spindle of said lathe, wherein said bar feeder comprises a servomotor;
   means for applying a constant force to said workpiece by said bar feeder;
   means for estimating a disturbance load torque based upon a torque command value supplied to the servomotor and an actual speed of the servomotor; and
   means for executing feedback control based on the estimated disturbance load torque, whereby the estimated disturbance load torque agrees with a force command value.

6. A force control device, comprising:
   means for supporting a workpiece by a Z-axis spindle of a lathe;
   means for controlling a position of the workpiece supported by a bar feeder and by the Z-axis spindle of said lathe, wherein said bar feeder comprises a servomotor;
   means for applying a constant force to said workpiece by said bar feeder;
   means for estimating and feeding back a disturbance load torque to said means for controlling based on an external load applied to said workpiece; and
   means for executing feedback control so that said disturbance load torque is estimated based upon a torque command value supplied to said servomotor and an actual speed of said servomotor.

* * * * *